Dec. 14, 1926.
F. O. BOYER
BRAKE TESTING DEVICE
Filed Sept. 7, 1923
1,611,099
2 Sheets-Sheet 1
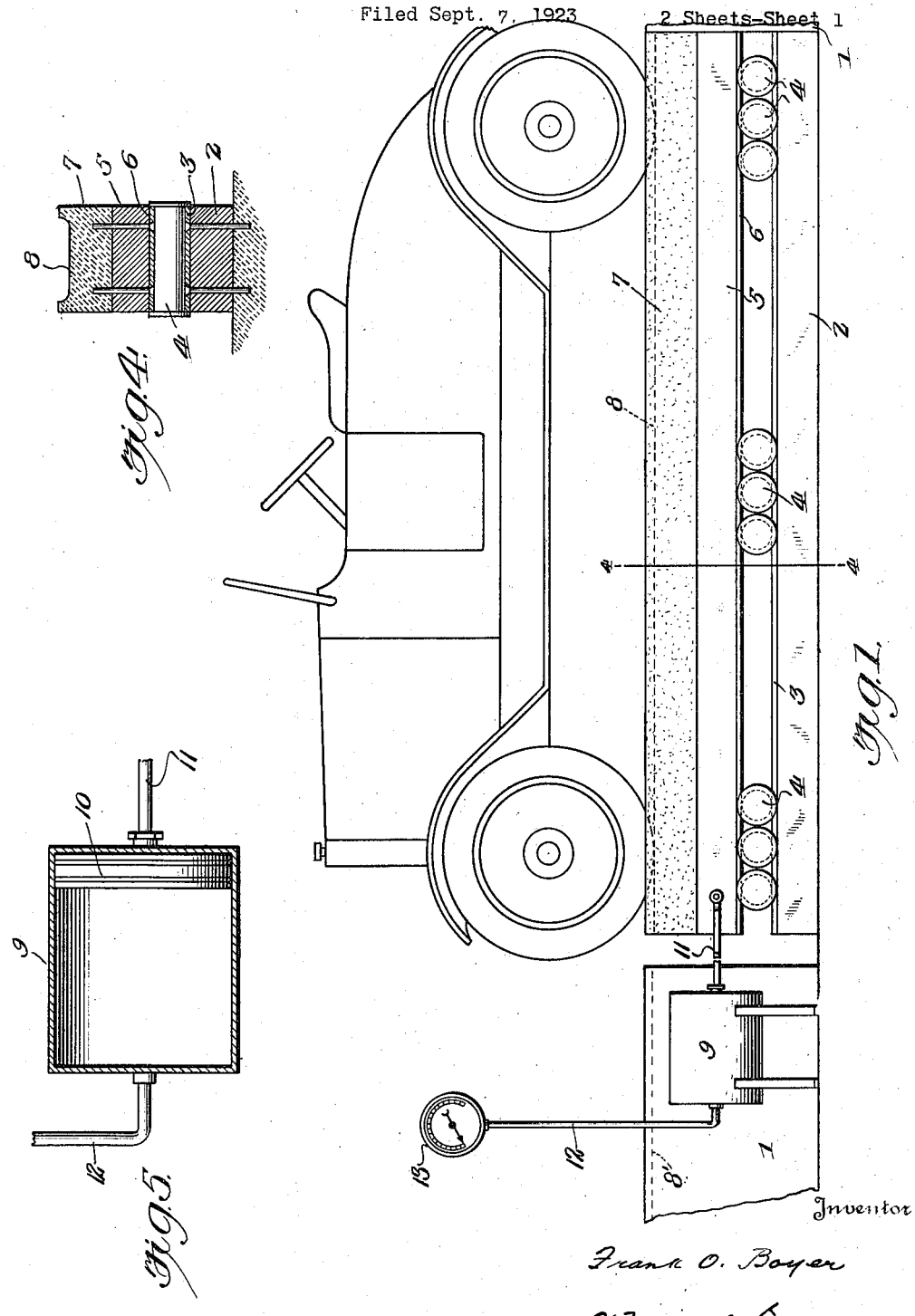

Dec. 14, 1926.                                      1,611,099
                    F. O. BOYER
                 BRAKE TESTING DEVICE
                 Filed Sept. 7, 1923        2 Sheets-Sheet 2
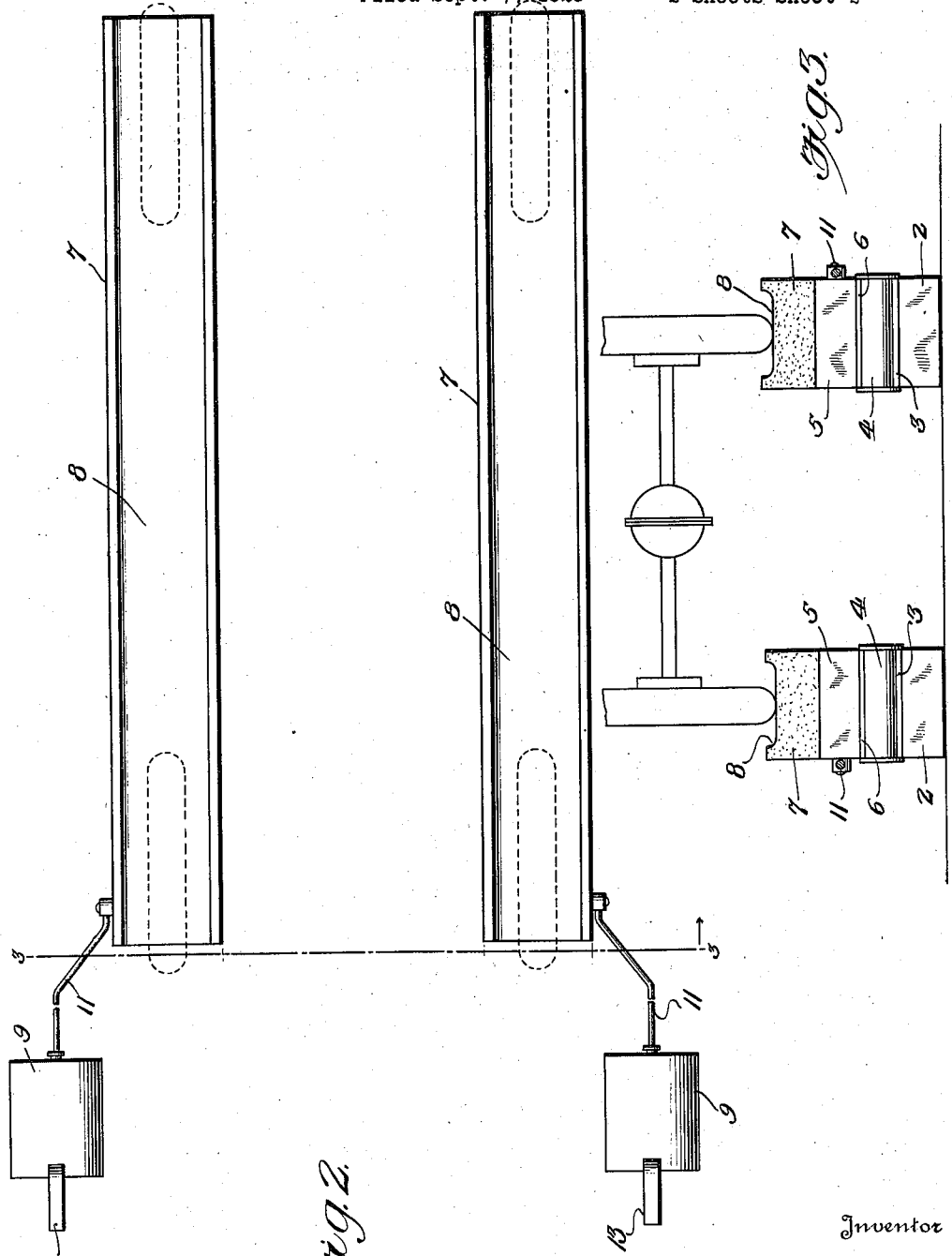

Patented Dec. 14, 1926.

1,611,099

UNITED STATES PATENT OFFICE.

FRANK O. BOYER, OF HONOLULU, TERRITORY OF HAWAII.

BRAKE-TESTING DEVICE.

Application filed September 7, 1923. Serial No. 661,429.

This invention relates to means for testing the action of brakes upon vehicle wheels.

It is very important that the brakes of an automobile or other vehicle be so adjusted that they will act with substantially equal force upon both of the rear wheels thereof, and, while this is true, both of the brakes operated by the emergency lever and foot pedal, the condition of the foot pedal brakes is usually the more important, since the latter have by far the greater usage.

If the braking action upon the pairs of wheels is not substantially equal, it is obvious that, when the brakes are applied they act more forcibly upon one wheel than upon the other, resulting in a greater retarding force upon one of the wheels, and causing the automobile to skid. This inequality in the braking action, on opposite sides of an automobile, is a very large factor in the very numerous automobile accidents which are so prevalent.

The importance of equalizing the braking effect on opposite wheels is generally recognized in the automobile industry, and means are usually provided for manual adjustment of each brake. However, without any actual advance knowledge of the amount of difference in the braking action on the two wheels, the adjustments are mere guesswork, and even after such adjustments, the braking action of the two wheels may be, and generally, is, radically different.

The primary object of the present invention, therefore, is the provision of means, prior to such adjustment, whereby the difference in the retarding effect of the brakes on the opposite wheels, may be automatically indicated, and whereby to apprise the operator of the exact adjustment necessary, in one or both wheels, to equalize the braking effect.

Another object of the invention is the provision of means for indicating the braking effect on each wheel by the simple expedient of merely applying both brakes.

Other objects of the invention will be made apparent in the following specifications, when read in connection with the drawings forming a part thereof, which drawings show one practical form of the invention.

In said drawings:

Fig. 1 is a side elevation of an automobile, in operative position on my testing device;

Fig. 2 is a vertical plan view of my device, with the automobile wheels shown in dotted lines;

Fig. 3 is a section on line 3—3 of Fig. 2;

Fig. 4 is a section on line 4—4 of Fig. 1; and

Fig. 5 is a sectional view of a compression cylinder forming a portion of my indicating device.

It may be stated that my device is in effect a dynamometer, adapted to measure the degree of braking power applied to each of the wheels of an automobile.

Now referring specifically to the drawings, 1 indicates the concrete floor of a garage or shop, or the foundation wherein my device is situated. As here shown the device is located in a cavity in the floor, but could also be positioned directly upon the floor, with ramps leading thereto.

At the base of the cavity provided in the floor is a rigid foundation 2, preferably provided with a metallic covering 3, adapted as a track for a plurality of flanged rollers 4. Mounted upon the rollers 4, is a carrier member, here shown as a sill 5, carrying a roller track 6 upon its lower surface, and secured by bolts, or otherwise, to a concrete top member 7, provided with a trough-shaped track 8 on its top surface.

It is understood that the foundation 2, and the members supported thereby, are spaced from the adjacent faces of the floor 1, to permit of sufficient longitudinal movement of the sill 5 and member 7, for a purpose to be presently described.

The device preferably includes a compression cylinder 9, in operative engagement with each of the sills 5. As here shown, the cylinders 9 are positioned in a cavity in the floor 1, and in a plane parallel with the plane of the sills 5, but it is obvious that they may be located in any position adapted for operative connection to the sills 5, in the manner now to be described.

Each cylinder 9 is equipped with a piston 10, having a rod 11 extending through the cylinder head and rigidly secured to the sills 5. Extending into the opposite end of the cylinders 9 is a tube 12, leading to a gage 13, adapted to register on its face the degree of air compression in the cylinder 9.

In the practical operation of my device, the automobile, of which the brakes are to be subjected to the test, is run upon tracks 8 on the members 7, and while in motion, and braking wheels are in contact therewith, the brakes are simultaneously applied to each wheel by depressing the foot pedal or operating the emergency lever. When the wheels contact members 7 and brakes are applied, said members under the forward thrust of the wheels, will at once initiate a forward movement over the rollers 4. The initial movement forward, of each of the members 7, under the thrust of the wheels, will cause the piston rod 11 attached to each sill 5, to push its connected piston 10 forward in its cylinder 9, thereby compressing the air in said cylinder and communicating such pressure to the gauge 13, causing the dial to indicate the degree of air pressure in its associated cylinder. If both the dials indicate the same pressure, it follows that both of the members 7 moved forward the same distance under the forward thrust of the wheels; that both wheels have equal effect upon the retardation of momentum of the automobile, and that, therefore, the braking effect of both wheels is equal, and that no adjustments are necessary.

If one dial indicates a pressure greater than the other, it necessarily follows that there has been a greater forward movement of that member 7 which is connected to the cylinder associated with the dial indicating the greater pressure. Such excess movement of one of the members 7, over the other, indicates that in that wheel producing such excess movement of the member 7 is being developed the greater braking force, therefore, the difference in registration upon the dials on the gauges 13 clearly shows the difference in the braking effect of the two wheels, thereby indicating the degree of manual adjustment necessary to equalize the brakes. After the adjustments, the brakes may be tested again by repeating the testing operation just described, and, if necessary, again, until a satisfactory equalization of brakes is effected. It will be understood that the indicating pointers on the dials will remain in the positions to which they have been moved by the forward thrust of members 7, until released, so that any difference in the effect of the brakes may be readily noted.

The length of the members 7 may be governed as desired, it merely being necessary that the rear wheels of the automobile be permitted room for sufficient movement thereover, before, and perhaps after, the brakes are applied. Most of the present day automobile brake bands are adjusted by a threaded bolt, and the operator, by noting the difference in the readings on the dials of the gages 13, will readily be able to determine the necessary number of rotations of the adjusting bolts, to effect the desired equalization of the brakes.

From the foregoing, it will be obvious that I have devised an apparatus for the purpose described, which absolutely eliminates the necessity of jacking up the wheels for the purpose of testing the braking effects upon each of them. I am aware of devices wherein, after the brakes are applied, the car is jacked up and a lever, equipped with a gage, is utilized to turn the wheel against the brake, the gage indicating the gripping power of the brake. Such devices are cumbersome and not dependable, however, and both wheels must be treated separately, and in the same manner. My device is automatic in its operation, indicating at once, upon the application of the brakes in the ordinary way, the difference in the braking effect upon the opposite wheels.

Modification of the herein-described structure may be suggested to those skilled in the art, but my invention covers all such embodiments as fall fairly within the scope of the appended claims.

I claim:

1. A testing device for brakes used on automobile wheels and the like, comprising a support, two parallel members mounted on said support and longitudinally and independently movable with respect thereto, and means for indicating the movement of each member relatively of said support, when the brakes are applied while said wheels are moving over said members, said means comprising a compression cylinder for each member, and having its piston rigidly connected to said member whereby movement of the latter will move the piston longitudinally in said cylinder, and an indicating gage carried by each cylinder and adapted for actuation by the compressed air in the cylinder.

2. A testing device for brakes used on automobile wheels and the like, comprising a support, two parallel members mounted on said support and longitudinally and independently movable with respect thereto, anti-friction devices positioned between said members and said support, and means for indicating the movement of each member relatively of said support when the brakes are applied while said wheels are moving over said members, said means comprising a compression cylinder for each member, and having its piston rigidly connected to said member whereby movement of the latter will move the piston longitudinally in said cylinder, and an indicating gage carried by each cylinder and adapted for actuation by the compressed air in the cylinder.

3. A testing device for brakes used on automobile wheels and the like, comprising a support, two parallel members mounted on said support, said members being independently movable longitudinally of said support and grooved to receive said wheels, a plurality of rollers between said members, and means for indicating the movement of each member relatively of said support, when the brakes are applied while the wheels are moving over the former, said means comprising a compression cylinder in alignment with each member, a rod rigidly connecting each member to the piston of the associated cylinder, whereby movement of said member will move the piston longitudinally of the cylinder and compress the air therein, and an indicating gage carried by each cylinder and adapted for actuation by said compressed air.

4. A testing device for brakes used on automobile wheels and the like, comprising, in combination with a support, two parallel members adapted to receive the wheels of an automobile, each member being independently movable relatively of said support, and a gage operatively connected to each member and adapted to register the degree of movement of its associated member when the brakes are applied to the wheels while the latter are moving along said members.

In testimony whereof I affix my signature.

FRANK O. BOYER.